Feb. 13, 1962  R. E. SCHELL  3,020,997
ARTICLE CONTROL APPARATUS FOR FEEDING CONVEYORS
Filed Aug. 28, 1958
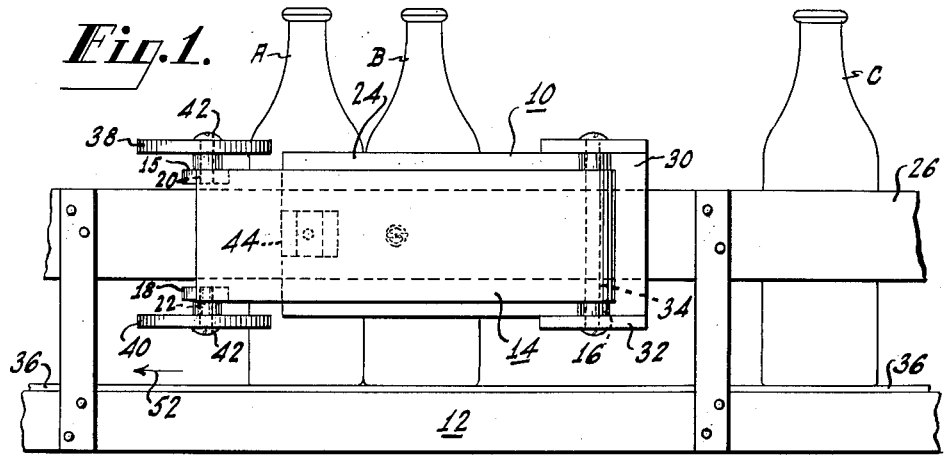
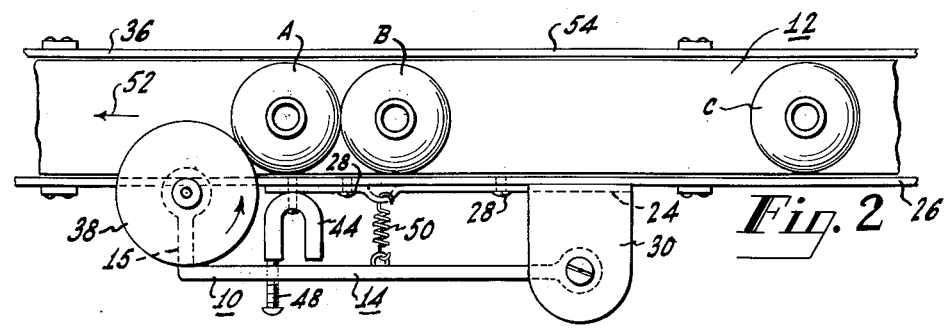
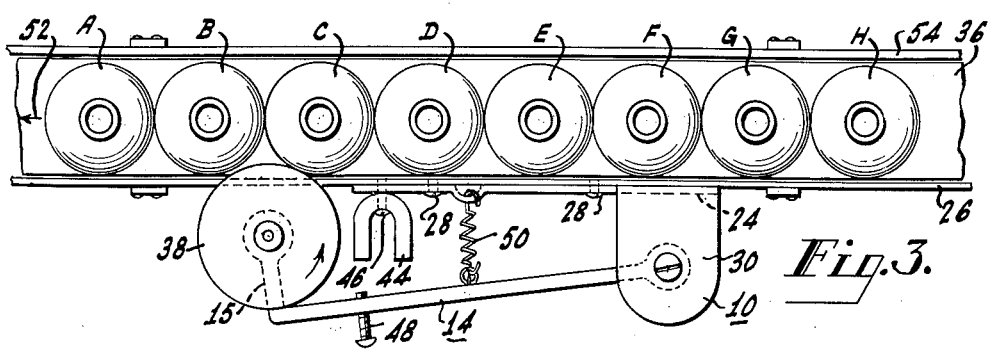
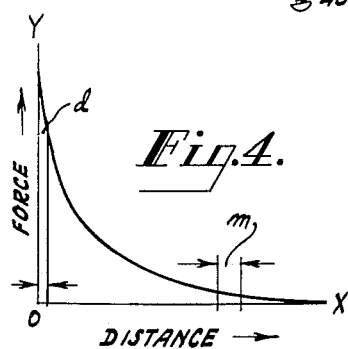
INVENTOR.
ROGER E. SCHELL
BY Morris A. Rabkin
ATTORNEY

# United States Patent Office 3,020,997
Patented Feb. 13, 1962

3,020,997
ARTICLE CONTROL APPARATUS FOR
FEEDING CONVEYORS
Roger E. Schell, Woodbury, N.J., assignor, by mesne assignments, to Crown Cork and Seal Company, Inc., Philadelphia, Pa., a corporation of New York
Filed Aug. 28, 1958, Ser. No. 757,788
10 Claims. (Cl. 198—34)

This invention relates generally to apparatus for controlling the spacing of articles on a feeding conveyor, and more specifically to apparatus for crowding randomly spaced articles on a conveyor chain or belt into groups wherein adjacent articles will arrange themselves in abutting alignment. The apparatus of the present invention is particularly useful in conjunction with conveyor systems used for feeding bottles, and the like, to various stations for filling, inspecting, crating or otherwise operating upon the bottles and their contents.

In processing bottled merchandise by means of feeding conveyors having a moving chain or belt for moving the bottles along a confined path, it is usually desirable for the bottles to be moved in an abutting alignment with each other in order to provide efficient processing and to prevent breakage of the bottles. A tall glass bottle, such as a conventional beer bottle, for example, has a relatively narrow base compared to its height. Such a bottle is relatively unstable on a moving conveyor belt, and it tends to fall if it is spaced from adjacent bottles. When, however, a line of bottles are crowded and moved in an abutting alignment with each other, the bottles tend to support each other, and they have greater upright stability. Furthermore, the device, such as star wheels, for example, of most bottle handling mechanisms which feed the bottles into a machine favor, in their operation, an abutting alignment of bottles. Consequently, fewer bottles break and fewer stoppages in the bottle processing are experienced if an abutting alignment is maintained.

While it has been previously proposed to provide means for grouping articles on feeding conveyors into abutting alignment, the previously proposed apparatus usually employed electrical circuits and/or relatively complicated mechanisms.

Accordingly, it is an object of the present invention to provide improved article control apparatus for grouping a line of randomly spaced articles on a conveyor belt into abutting alignment.

It is another object of the present invention to provide improved apparatus that is easily adjustable to group a desired number of randomly spaced articles on a moving belt into abutting alignment.

A further object of the present invention is to provide an improved article hold-back device for feeding conveyors that is simple in structure and operation, economical to manufacture, and highly efficient in use.

In accordance with the present invention, the foregoing objects and related advantages are attained in an improved article hold-back device adapted for use with a moving conveyor belt. The device comprises a lever member having one end pivotally mounted at a fixed distance from the conveyor belt. The other end of the lever member is adapted to project into the path of travel of the articles on the moving conveyor belt and is held there by a magnet that is fixedly disposed with respect to the conveyor belt. Randomly spaced articles are stopped by the lever member in a manner whereby friction is caused between the moving belt and the stopped articles. When the force of friction, determined by a predetermined number of articles with respect to the moving belt, is sufficient to overcome the holding force of the magnet, the lever member is rotated through a small angle away from the conveyor belt and the articles, in abutting alignment, are allowed to proceed along the belt. A spring, exerting a rotational force that is relatively much weaker than that produced by the magnet, may be connected to the lever member to urge it toward the path of movement of the articles.

If there is a space between two adjacent articles on the belt, the spring urges the lever member into this space, closing the magnetic gap between the lever member and the magnet, and causes the articles to slip on the moving belt until the force of friction of a predetermined number of articles, in abutting alignment with each other, can again overcome the holding force of the magnet. Adjustments may be provided in the form of a nonmagnetic screw or a shim to vary the distance between the magnet and the lever member for the purpose of varying the frictional force necessary to overcome the holding force of the magnet. Thus, the number of abutting articles in a group may be controlled.

The novel features of the present invention, as well as the invention itself, both as to its organization and method of operation, will be understood in detail from the following description when considered in connection with the accompanying drawing in which:

FIG. 1 is a side elevational view of the hold-back device attached to a feeding conveyor and in a position for holding back spaced articles thereon;

FIG. 2 is a plan view of the hold-back device attached to the feeding conveyor for aligning articles thereon, in accordance with the present invention;

FIG. 3 is a plan view of the hold-back device attached to the feeding conveyor in a position wherein a plurality of articles are allowed to proceed in abutting alignment with each other along the feeding conveyor; and FIG. 4 is a graph used to explain the operation of a hold-back device of the present invention.

Referring now to FIGS. 1 and 2, there is shown a hold-back device 10 attached to a feeding conveyor 12 for grouping a plurality of articles A, B, C, . . . N into a group of at least a predetermined number of articles in abutting alignment. The device 10 comprises a lever member 14 that may be formed from a flat bar of magnetically attracted material. The lever member 14 is formed with a hole 16 extending transversely through the lever member 14 and adjacent to one end thereof. The other end of the lever member 14 comprises two parallel spaced flanges 15 and 18 extending rearwardly with respect to the main portion of the lever member 14. Each of the flanges 15 and 18 is formed with an opening 20 and 22 in vertical alignment, respectively.

Means are provided to mount the lever member 14 pivotally at a fixed distance from the feeding conveyor 12. To this end a base plate 24 is fixed to a guide rail 26 of the conveyor 12 by any suitable means, as by screw 28. The base plate 24 is formed with a pair of oppositely disposed parallel flanges 30 and 32 that extend forwardly from the main portion of the base plate. The lever member 14 is mounted for rotation about a pivot pin 34 passing through aligned holes in the flanges 30 and 32 and through the hole 16 in the lever member 14. The ends of the pin 34 may be peened, or held in place by any other suitable means. In the embodiment shown, the pin 34 is substantially perpendicular to the belt 36 of the feeding conveyor 12. It will now be understood that the lever member 14 is adapted to rotate about the pivot pin 34 towards and away from the feeding conveyor 12.

The free end portion of the lever member 14 will project into the path of travel of the articles A, B, C, . . . N in one extreme position of rotation of the lever member 14. Each of a pair of freely rotating idler wheels 38 and 40 is mounted on opposite sides of the lever member 14 by any suitable means, such as screws 42, passing through the vertically aligned holes 20 and 22 in the flanges 15 and 18. It will now be understood that the horizontally disposed idler wheels 38 and 40, forming a part of the lever member 14, will project into the path of travel of the articles A, B, C, . . . N in one extreme position of rotation of the lever member 14.

A permanent magnet 44 is mounted on the base plate 24, as by a screw 46. The magnet 44 is disposed with respect to the lever member 14 to attract it by rotating it about the pivot pin 34 whereby the idler wheels 38 and 40 will project into the path of travel of the articles A, B, C, . . . N, as shown in FIG. 2.

The holding force of the magnet 44 acting on the lever member 14 may be varied. Thus, a non-magnetic screw 48, threaded through the lever member 14 and disposed perpendicularly to the magnet 44, may be used to limit the distance between the lever member 14 and the magnet 44 in one extreme position of rotation of the lever member 14. The screw 48 functions as a non-magnetic shim in a manner to be hereinafter described.

A spring 50 is connected between the lever member 14 and the base plate 24, by any suitable means known in the art, for the purpose of lightly urging the lever member 14 into the confined path of travel of the articles A, B, C, . . . N. It will be noted that the confined path of travel of the articles on the feeding conveyor 12 is downstream in the direction of the arrow 52, and between the guide rails 26 and 54.

The operation of the hold-back device 10 of the present invention will be described in connection with the articles A, B, C, . . . N moving on the belt 36 of the feeding conveyor 12. The articles A, B, C, . . . N may be considered to be conventional beer bottles on their way to a processing station. Let it be assumed that it is desired to feed at least eight articles A, B, C, D, E, F, G, and H in an abutting alignment for efficient processing. Let it also be assumed that the articles A to H are randomly spaced. The spring 50 and the magnet 44 will rotate the lever member 14 into an extreme position thereof, wherein the idler wheels 38 and 40 will project into the path of travel of the articles on the conveyor belt 36. When the article A touches the ilder wheels 38 and 40, as shown in FIGS. 1 and 2, the holding force of the magnet 44 on the lever member 14 will be great enough to prevent the article A from moving with the moving belt. Consequently, the article A will remain stationary. The article B will also stop moving with the moving belt when it abuts the article A. In a similar manner, the articles C to H will align themselves with the articles A and B in an abutting alignment, as shown in FIG. 3. By a previously made adjustment of the screw 48, the holding force of the magnet 44 on the lever member 14 has been adjusted to be overcome by the frictional force determined by eight articles on the moving belt 36. When eight articles A to H have been aligned, the lever member 14 is rotated through a small angle away from the feeding conveyor 12, as shown in FIG. 3. In this latter position the holding force of the magnet 44 on the lever member 14 is very markedly reduced. It will now be understood that if the force exerted by the spring 50 on the lever member 14 is less than the force of friction of one article with respect to the moving belt 36, the articles A to H will be crowded together in abutting alignment and will move past the hold-back device 10.

By varying the distance between the lever member 14 and the magnet 44, as by the screw 48 or any other suitable shim means, the magnetic holding force on the lever member 14 may be varied so that the number of articles permitted to be grouped by the hold-back device 10 may also be varied.

Referring now to FIG. 4, there is shown a graph, in arbitrary values, of how the holding force of the magnet 44 on the lever member 14 varies with the distance of the magnet 44 from the lever member 14. The holding force may be decreased from a maximum, as on direct contact between the lever member 14 and the magnet 44, to a lesser value by adjusting the screw 48, as shown over the distance $d$ in FIG. 4. In contrast to these large values of holding force, the holding force of the magnet 44 on the lever member 14 is very markedly reduced when the lever member 14 oscillates through a slight angle while a group of aligned articles is being conveyed by the belt past the hold-back device, with a range of values as shown over the small distance $m$ on the graph.

If the spring tension exerted on the lever member 14 by the spring 50 is less than the force of friction exerted by a single article with respect to the moving belt 36, the last aligned article in any group will be permitted to pass the holdback device 10 before the lever member 14 will rotate and project into the path of travel of the articles. The rotated lever member 14 will now be held in this extreme position by the relatively much stronger holding force of the magnet 44.

Thus, there has been shown and described, in accordance with the objects of the present invention, a hold-back device for crowding radomly spaced articles on a moving conveyor belt in a manner whereby the articles are made to proceed in an abutting alignment in groups of at least a predetermined number of articles. Only parts of the lever member 14 of the hold-back device may be constructed of magnetic material, but this is also within the scope of the contemplated invention. It is noted, also, that the hold-back device may be placed in various positions with respect to the feeding conveyor, as long as the free end of the lever member 14 can project into the path of travel of the articles. While a permanent magnet is preferable in the hold-back device described, it is understood that an electromagnet may also be used. Also, the spring means may be dispensed with where the lever member may be urged towards the conveyor by gravity.

What is claimed is:

1. Apparatus adapted for use with a feeding conveyor, said apparauts comprising a control member, means mounting said control member for movement towards and away from said conveyor, said control member including a part normally extending over said conveyor when said control member is in one extreme position of movement, yieldable means coupled to said control member tending constantly to urge said control member in a direction toward its said one extreme position and to maintain said part extended over said conveyor, said last-named means being yieldable in response to a force applied to said control member in a direction to move said control member away from its said one extreme position, and magnetic means associated with said control member disposed to force said control member toward said conveyor in said first mentioned direction.

2. Apparatus comprising a base plate, a lever member, means to mount said lever member pivotally on one side of said base plate, a magnet, means to mount said magnet between said base plate and said lever member to pull said lever member towards said base plate, a portion of said member extending through the plane defined by the other side of said base plate when said lever member is attracted by said magnet, a spring, and means connecting said spring between said base plate and said lever member.

3. Apparatus comprising a base plate, a lever member, means to mount said lever member pivotally on one side of said base plate, a magnet on said base plate disposed to attract said lever member, a portion of said lever member extending transversely to said base plate when said lever member is attracted by said magnet, a spring, means connecting said spring between said base plate and said lever member, and adjusting means cooperating with said lever member and said magnet to vary the distance between said lever member and said magnet when said lever member is attracted to said magnet.

4. Apparatus comprising a base plate, a lever member, means to mount said lever member pivotally on said base plate, a magnet on said base plate disposed to attract said lever member, a portion of said lever member extending transversely to said base plate when said lever member is attracted by said magnet, spring means between said base plate and said lever member, and non-magnetic screw means on said lever member disposed to vary the minimum distance between said lever member and said magnet when said lever member is attracted to said magnet.

5. Apparatus for grouping articles conveyed in succession on a moving belt, said apparatus comprising a lever member, means to mount said lever member pivotally at a fixed distance from said belt, a magnet fixed with respect to said belt and disposed to attract said lever member whereby a portion of said lever member will stop the movement of said articles and will cause friction between said articles and said belt, and the holding force of said magnet being adapted to be overcome by the frictional force of a predetermined number of said articles with respect to said belt.

6. Apparauts for grouping articles conveyed in succession on a belt moving along a confined path, said apparatus comprising a lever member, means to mount said lever member pivotally at a fixed distance from said path, magnetic means fixed with respect to said path and disposed to attract said lever member so that a portion of said lever member projects into said path to stop the movement of spaced articles and to cause friction between said stopped articles and said moving belt, the holding force of said magnetic means being adapted to be overcome by the frictional force of a predetermined number of said articles with respect to said belt, and spring means connected to said lever member and disposed to urge said lever member towards said path.

7. Apparatus for grouping articles conveyed in succession on a belt moving along a confined path, said apparatus comprising a lever member, means to mount said lever member pivotally at a fixed distance from said path, magnetic means fixed with respect to said path and disposed to attract said lever member whereby a portion of said lever member projects into said path so as to stop the movement of said articles and to cause friction between said articles and said belt, the holding force of said magnetic means being adapted to be overcome by a frictional force of a predetermined number of said articles with respect to said belt, and means on said lever member to adjust the minimum distance between said lever member and said magnetic means.

8. In a hold-back device of the type for use with a conveyor having a moving belt to group randomly spaced articles linearly in an abutting alignment, a lever member, means to mount said lever member pivotally at a fixed distance from said belt, a magnet mounted at a fixed distance from said belt and disposed to attract said lever member to one extreme position of rotation whereby a portion of said lever member projects into the line of travel of said articles on said belt, the holding force of said magnet being adapted to be overcome by the frictional force of a predetermined number of said articles on said belt, and spring means connected to said lever member to urge said lever member in the same direction as the force of attraction of said magnet.

9. In a hold-back device of the type used with a conveyor having a moving belt to group randomly spaced articles linearly in an abutting alignment, a lever member, means to mount said lever member pivotally at a fixed distance from said belt, a magnet, means to mount said magnet fixedly with respect to said belt to attract said lever member to one extreme position of rotation whereby a portion of said lever member projects into the line of travel of said articles on said belt, the holding force of said magnet being adapted to be overcome by the frictional force of a predetermined number of said articles on said belt, and means to adjust the minimum distance between said magnet and said lever member.

10. Apparatus for crowding spaced articles along a conveyor of the type having a moving belt, said apparatus comprising a lever member, means to mount said member pivotally with respect to said belt whereby said lever may rotate through small angles towards and away from said belt, said lever member comprising at least in part magnetic material, magnetic means fixedly disposed with respect to said moving belt to attract said magnetic material thereto on one extreme position of rotation of said lever member, said lever member comprising means extending into the path of travel of said articles on said belt whereby to interrupt the travel of said spaced articles, and the holding force of said magnetic means being adapted to be overcome by the friction of a predetermined number of said articles on said belt whereby to rotate said member about said pivot and out of the path of travel of said articles.

References Cited in the file of this patent
UNITED STATES PATENTS

| | | |
|---|---|---|
| 2,690,832 | Salter | Oct. 5, 1954 |
| 2,714,440 | Forty | Aug. 2, 1955 |
| 2,757,780 | Sousa | Aug. 7, 1956 |